(12) United States Patent
Hsu (10) Patent No.: US 11,056,815 B2
(45) Date of Patent: Jul. 6, 2021

(54) ELECTRICAL CONTACT AND CARRIER ASSOCIATED THEREWITH

(71) Applicants: FU DING PRECISION COMPONENT (SHEN ZHEN) CO., LTD., Shenzhen (CN); FOXCONN INTERCONNECT TECHNOLOGY LIMITED, Grand Cayman (KY)

(72) Inventor: Shuo-Hsiu Hsu, New Taipei (TW)

(73) Assignees: FUDING PRECISION COMPONENTS (SHENZHEN) CO., LTD., Shenzhen (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 16/699,325

(22) Filed: Nov. 29, 2019

(65) Prior Publication Data

US 2020/0176911 A1    Jun. 4, 2020

(30) Foreign Application Priority Data

Nov. 30, 2018  (CN) .......................... 201811453430.3

(51) Int. Cl.
*H01R 13/24* (2006.01)
*H01R 13/03* (2006.01)

(52) U.S. Cl.
CPC ............. *H01R 13/24* (2013.01); *H01R 13/03* (2013.01)

(58) Field of Classification Search
CPC .... H01R 12/58; H01R 13/17; H01R 13/2457; H01R 13/2492; H01R 13/245;
(Continued)

(56) References Cited

U.S. PATENT DOCUMENTS 4,354,729 A * 10/1982 Grabbe ................ H05K 7/1069
                                                                        29/874
5,984,693 A * 11/1999 McHugh .............. H05K 7/1069
                                                                        439/515
(Continued)

FOREIGN PATENT DOCUMENTS

CN        110416761 A        11/2019
TW        M437555            9/2012

*Primary Examiner* — Abdullah A Riyami
*Assistant Examiner* — Marcus E Harcum
(74) *Attorney, Agent, or Firm* — Ming Chieh Chang; Wei Te Chung (57) ABSTRACT

An electrical contact includes a planar main body, a supporting arm extending upwardly from an upper edge thereof, and a spring arm extending curvedly and upwardly from a lower edge thereof with a contacting region at a free end region. The spring arm will contact the supporting arm when the spring arm is downwardly pressed by the CPU. A connecting part extends from an upper portion of the main body for connecting to a carrier strip, and includes a first connecting section coplanar with the main body, and a second connecting section perpendicular to the first connecting section wherein the carrier strip is connected to an upper edge of the second connecting section so as to be spaced from the corresponding spring arm and supporting arm, thus avoiding improper coating thereupon when the gold coating is applied to the self-contacting regions of the spring arm and supporting arm.

11 Claims, 8 Drawing Sheets

(58) Field of Classification Search
CPC .................. H01R 13/2435; H01R 13/2442;
H01R 13/23; H01R 13/03
USPC .............................. 439/66, 72, 862, 885, 886
See application file for complete search history.

(56) References Cited

U.S. PATENT DOCUMENTS

| | | | | |
|---|---|---|---|---|
| 6,019,611 A * | 2/2000 | McHugh | ............ | H01R 13/2435 439/515 |
| 6,227,869 B1 * | 5/2001 | Lin | ............ | H05K 7/1069 439/515 |
| 6,749,440 B1 * | 6/2004 | Szu | ............ | H01R 13/2435 439/515 |
| 6,976,888 B2 * | 12/2005 | Shirai | ............ | H01R 13/2442 439/733.1 |
| 7,014,477 B2 * | 3/2006 | Tsai | ............ | H01R 13/2442 439/331 |
| 7,052,284 B2 * | 5/2006 | Liao | ............ | H01R 13/2435 439/66 |
| 7,074,048 B2 * | 7/2006 | Liao | ............ | H01R 12/52 439/66 |
| 7,297,010 B2 * | 11/2007 | Tsai | ............ | H01R 13/2442 439/331 |
| 7,367,814 B2 * | 5/2008 | Liao | ............ | H01R 12/57 439/71 |
| 7,377,789 B1 * | 5/2008 | Liu | ............ | H01R 13/2442 439/66 |
| 7,429,179 B2 * | 9/2008 | Ma | ............ | H01R 12/57 439/83 |
| 7,527,536 B2 * | 5/2009 | Chiang | ............ | H01R 13/2442 439/884 |
| 7,544,107 B2 * | 6/2009 | Gattuso | ............ | H01R 12/57 439/862 |
| 7,563,105 B2 * | 7/2009 | Liu | ............ | H01R 13/2492 439/66 |
| 7,708,608 B2 * | 5/2010 | Soh | ............ | H01R 43/20 439/862 |
| 7,927,159 B2 * | 4/2011 | Zhang | ............ | H01R 43/16 439/885 |
| 8,215,998 B1 * | 7/2012 | Ju | ............ | H01R 12/57 439/660 |
| 8,231,417 B2 * | 7/2012 | Zhu | ............ | H01R 12/716 439/862 |
| 8,454,373 B2 * | 6/2013 | Cheng | ............ | H01R 12/57 439/66 |
| 8,622,764 B2 * | 1/2014 | Aoki | ............ | G06F 1/16 439/342 |
| 8,637,165 B2 * | 1/2014 | Siahaan | ............ | H01R 13/03 428/675 |
| 8,801,476 B2 * | 8/2014 | Zhang | ............ | H01R 13/26 439/884 |
| 8,888,502 B2 * | 11/2014 | Terhune, IV | ...... | H01R 12/7076 439/66 |
| 8,888,525 B2 * | 11/2014 | Yeh | ............ | H01R 13/2457 439/539 |
| 8,956,194 B2 * | 2/2015 | Xie | ............ | H01R 13/516 439/862 |
| 9,882,296 B1 * | 1/2018 | Ju | ............ | H01R 13/432 |
| 10,148,024 B2 * | 12/2018 | Ju | ............ | H05K 3/3436 |
| 10,199,756 B2 * | 2/2019 | Ju | ............ | H01R 12/7076 |
| 10,389,050 B2 * | 8/2019 | Huang | ............ | H01R 13/2407 |
| 10,587,066 B2 * | 3/2020 | Ho | ............ | H01R 12/7076 |
| 10,658,775 B2 * | 5/2020 | Lin | ............ | H01R 12/716 |
| 2005/0020101 A1 * | 1/2005 | Deng | ............ | H01R 13/2442 439/71 |
| 2005/0287867 A1 * | 12/2005 | Tran | ............ | H01R 13/2435 439/515 |
| 2006/0276085 A1 * | 12/2006 | Ma | ............ | H01R 13/2464 439/862 |
| 2009/0061701 A1 * | 3/2009 | McAlonis | ............ | H01R 13/2442 439/862 |
| 2010/0184334 A1 * | 7/2010 | Ma | ............ | H01R 13/2442 439/626 |
| 2011/0111607 A1 * | 5/2011 | Chang | ............ | H01R 12/7076 439/70 |
| 2012/0178306 A1 * | 7/2012 | Ju | ............ | H05K 7/1069 439/660 |
| 2013/0084758 A1 * | 4/2013 | Mizuta | ............ | H01R 13/03 439/733.1 |
| 2013/0084759 A1 * | 4/2013 | Mizuta | ............ | H01R 13/03 439/733.1 |
| 2016/0197426 A1 * | 7/2016 | Kawaguchi | ............ | H01R 13/03 439/877 |

* cited by examiner

ELECTRICAL CONTACT AND CARRIER ASSOCIATED THEREWITH

1. FIELD OF THE DISCLOSURE

The invention is related to an electrical contact for use with an electrical connector, and particularly to an electrical contact with a linking structure adapted to be connected to a contact carrier strip so as to have the corresponding self-contacting region spaced and angled away from the carrier strip, thus avoiding wasting precious metal coating which is originally intended to be applied upon only the self-contacting region specifically.

2. DESCRIPTION OF RELATED ARTS

Notably, in the traditional contact for use within an electrical connector, the contacting section of the deflectable spring arm is applied with the precious gold coating for lowering the impedance thereof. In some connectors, an additional conductive path by self-contacting is formed for shorting the original transmission route when the spring arm is deflected by the CPU (Central Processing Unit), as shown in U.S. Pat. No. 6,019,611 wherein the deflectable spring arm touches the stationary supporting arm when the spring arm is downwardly pressed by the CPU. In other words, the original spring arm essentially provides a required mechanical characteristic for generating the proper force upon the CPU while the newly formed shorter path provides the required electrical characteristic for lowering the impedance thereof. In such a preferred design, it is also desired to apply the previous gold coating upon the corresponding self-contacting regions of the spring arm and the supporting arm. Anyhow, the carrier strip, which is originally linked with the supporting arm and adapted to be removed after the contact is completely inserted into the corresponding passageway of the connector housing, is essentially coplanar with the supporting arm, thus inevitably being coated with the previous gold material in a wasted manner.

It is desired to provide the contact of the connector with a linking structure properly positioned and configured to be connected to the corresponding carrier strip in a spaced manner, thus avoiding wasting the precious gold material when applying the gold material upon the interior self-contacting regions of the corresponding deflectable spring arm and the supporting arm.

SUMMARY OF THE DISCLOSURE

To achieve the above desired purpose, an electrical contact for use with an electrical connector made from sheet metal, includes a planar main body, a supporting arm extending upwardly from an upper edge thereof, and a spring arm extending curvedly and upwardly from a lower edge thereof with a contacting region at a free end region. The spring arm will contact the supporting arm when the spring arm is downwardly pressed by the CPU. A connecting part extends from an upper portion of the main body for connecting to a carrier strip, and includes a first connecting section coplanar with the main body, and a second connecting section perpendicular to the first connecting section wherein the carrier strip is connected to an upper edge of the second connecting section so as to be spaced from the corresponding spring arm and supporting arm, thus avoiding improper coating thereupon when the gold coating is applied to the self-contacting regions of the spring arm and the supporting arm.

DETAILED DESCRIPTION OF THE PREFERRED EMBODIMENT

Reference will now be made in detail to the embodiment of the present disclosure. Referring to FIGS. 1-8, an electrical contact 100 for use within an electrical connector housing (not shown) accommodating a CPU (not shown), includes a main body 1 extending in a vertical plane in the vertical direction Z, a supporting arm 2 upwardly extending from an upper edge of the main body 1 toward a second transverse direction T2 which is perpendicular to the main body 1, a spring/contacting arm 3 curved and upwardly extending from a lower edge of the main body 1 toward initially a first transverse direction T1 which is opposite to the second transverse direction T2, and a solder part 4 extending from a lower end of the main body 1. A pair of barbed structures 12 are formed on two lateral sides of the main body 1 for retaining the contact 100 in the connector housing. The contacting arm 3 includes an oblique section 31 confronting the supporting arm 2, and a contacting region 32 upwardly extending from the oblique section 31. When the contacting region 32 is pressed downwardly by the CPU, the contacting arm 3 is downwardly deflected to have the oblique section 31 contact the supporting arm 32 to form a so-called self-contacting thereof. The oblique section 31 and the supporting arm 32 commonly form a self-contacting region 10 on which the relative precious gold coating is applied. A connecting part 5 is formed on the upper portion of the main body 1, and includes a first connecting section 51 coplanar with the main body 1 while spaced from the supporting arm 2, and a second connecting section 52 extending laterally from the first connecting section and angled with (perpendicular to) the first connecting section 51. The second connecting section 52 includes an upper edge to which the carrier strip is linked.

Figure 3:
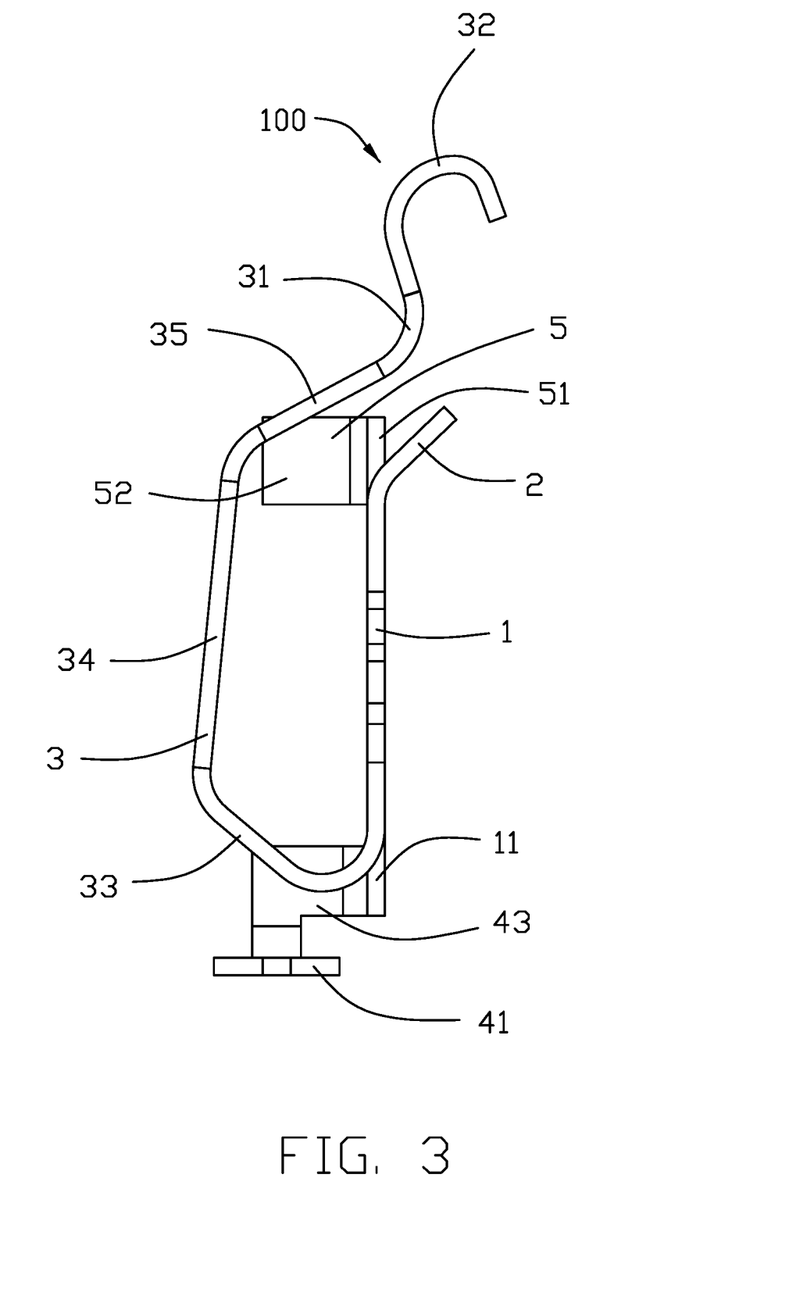
FIG. 3 is an elevational view of the electrical contact of FIG. 1 when the spring arm is in a free/relaxed manner.
Figure 4:
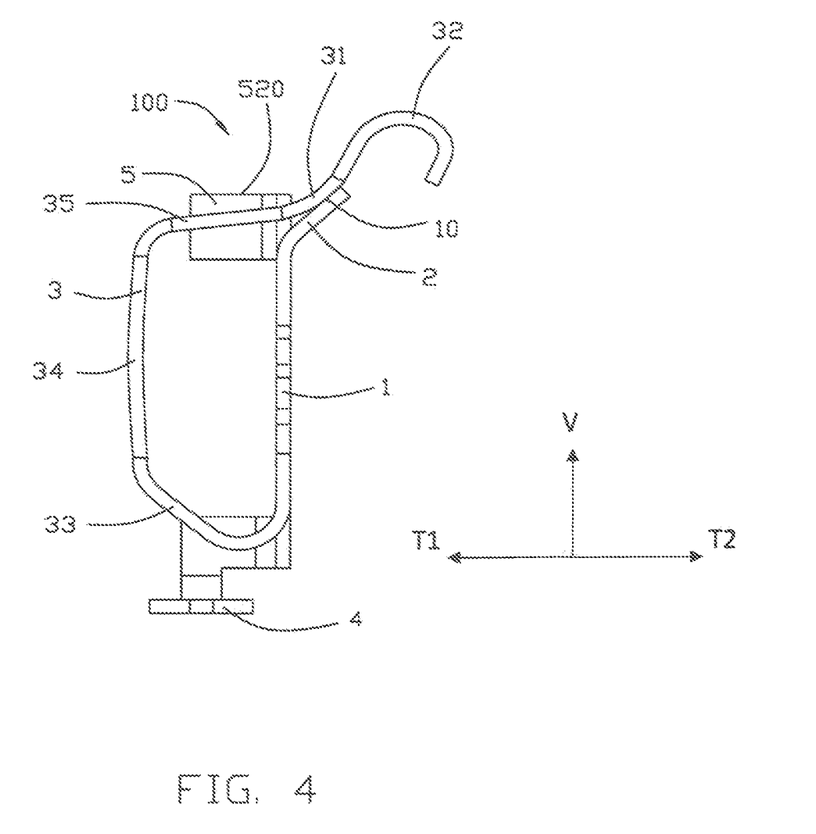
FIG. 4 is an elevational view of the electrical contact of FIG. 1 when the spring arm is downwardly pressed.
Figure 5:
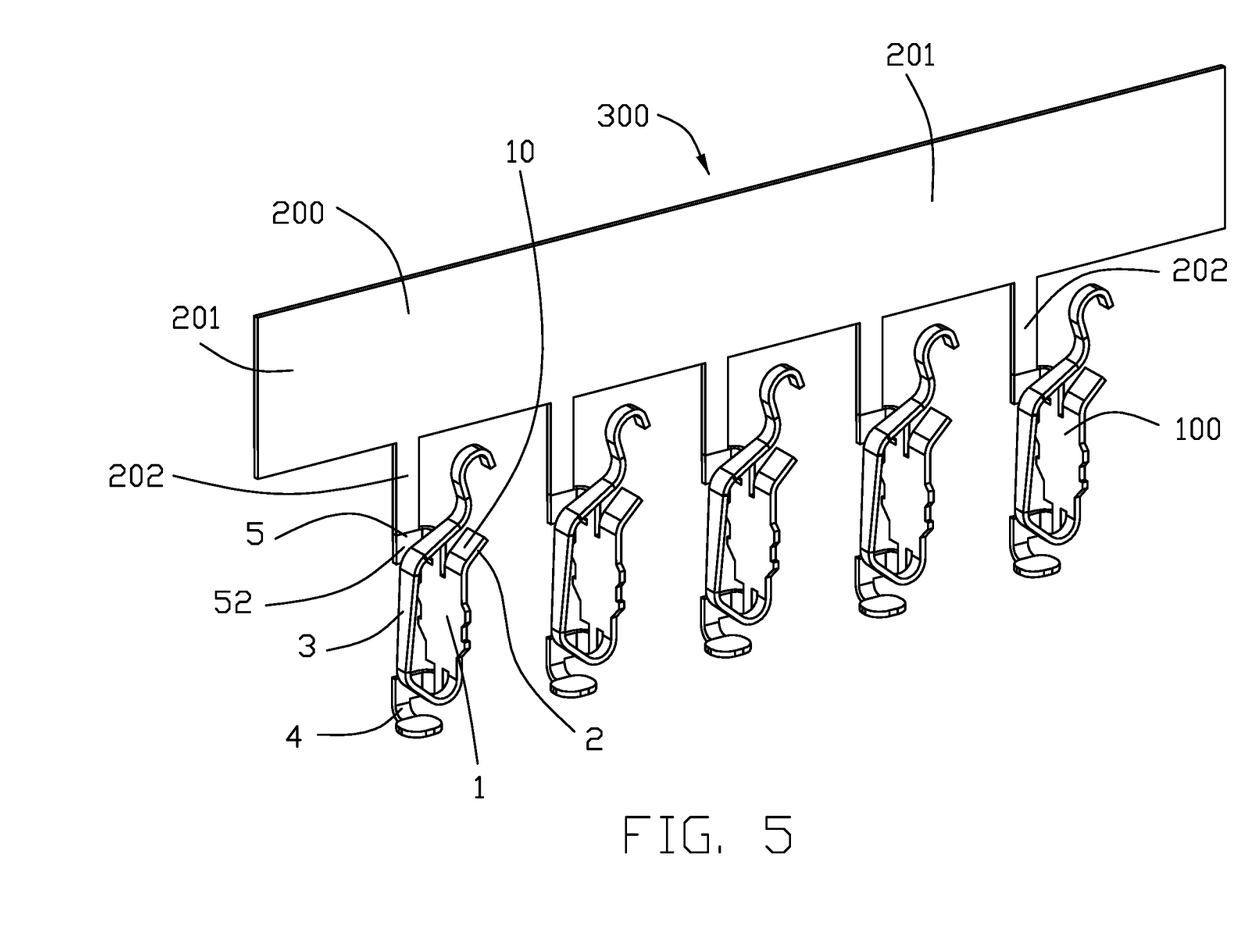
FIG. 5 is a perspective view of the contacts commonly linked to the carrier strip.
Figure 6:
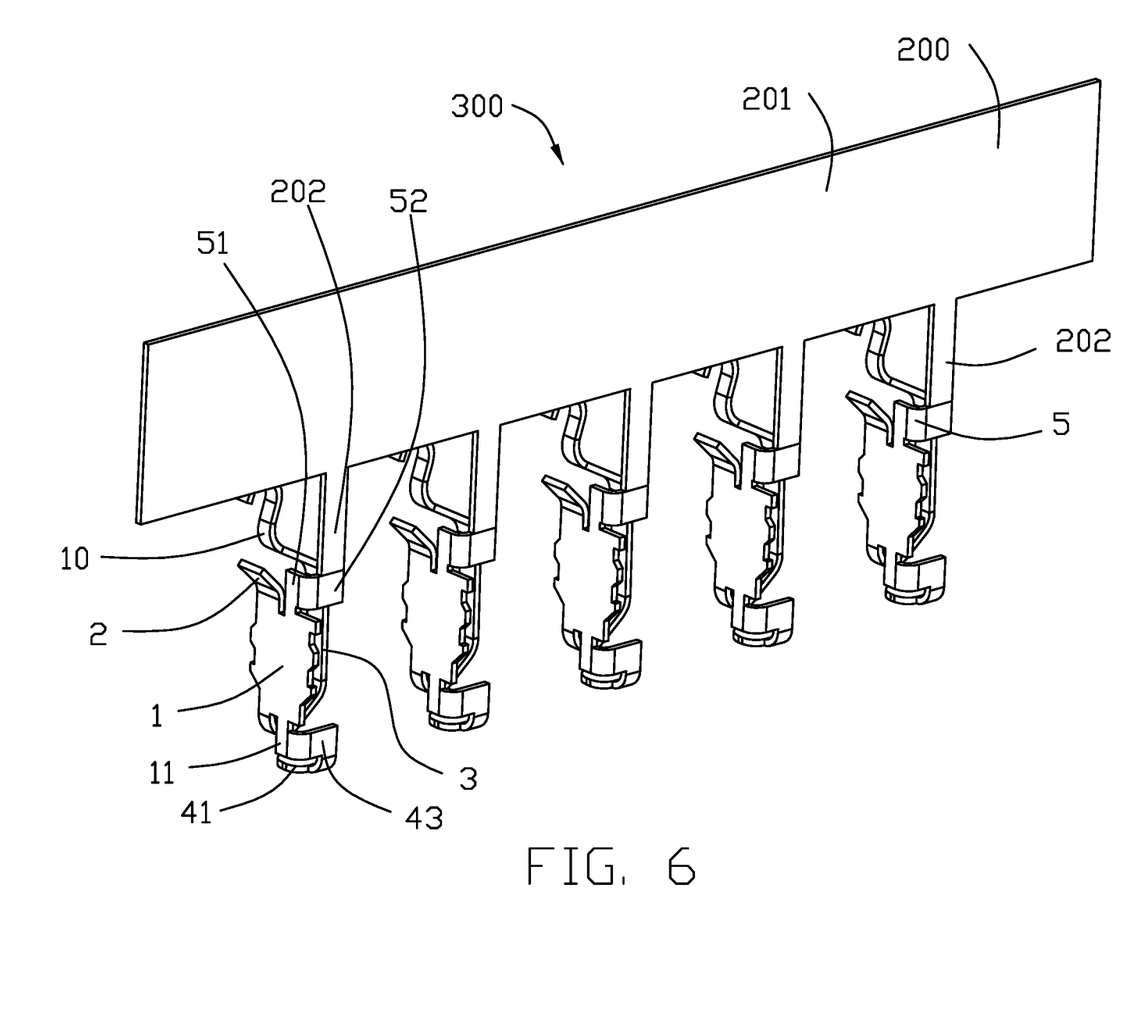
FIG. 6 is other perspective view of the contacts and the associated carrier strip of FIG. 5.

Referring to FIGS. 3 and 4, the self-contacting region 10 is located by one side of the main body 1 while the second connecting section 52, where the carrier strip is connected, is located on an opposite side of the main body 1. Therefore, it is essentially less possible to have the gold coating applied upon the carrier strip when applied upon the self-contacting region 10.

Figure 1:
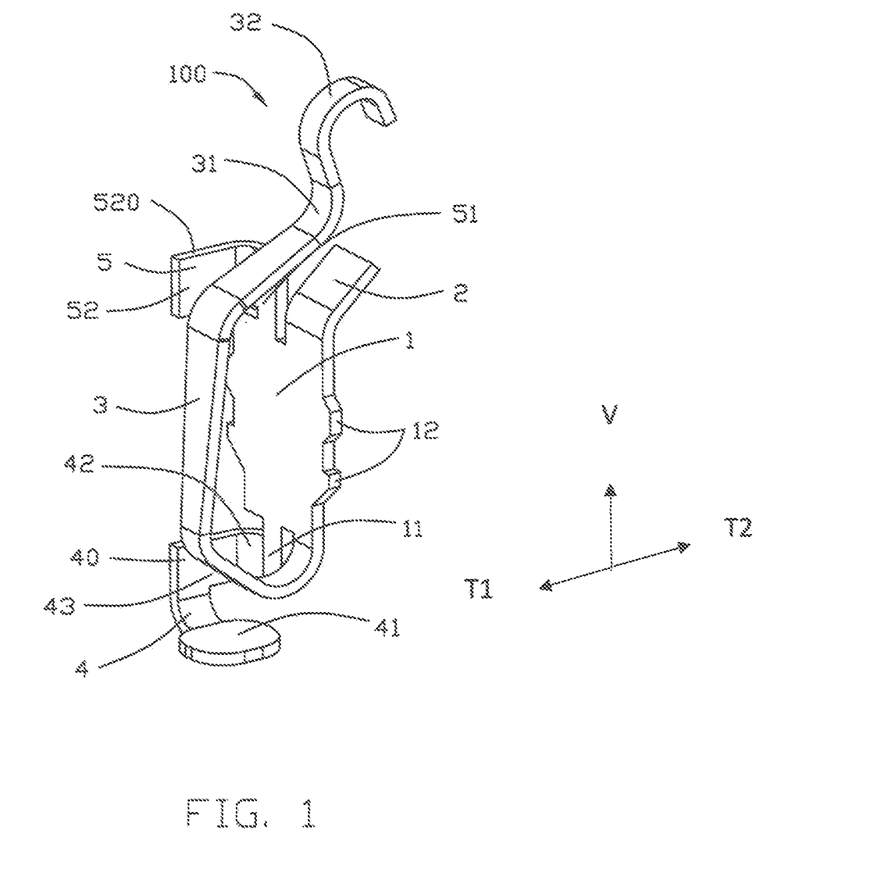
FIG. 1 is a perspective view of an electrical contact of the invention.
Figure 2:
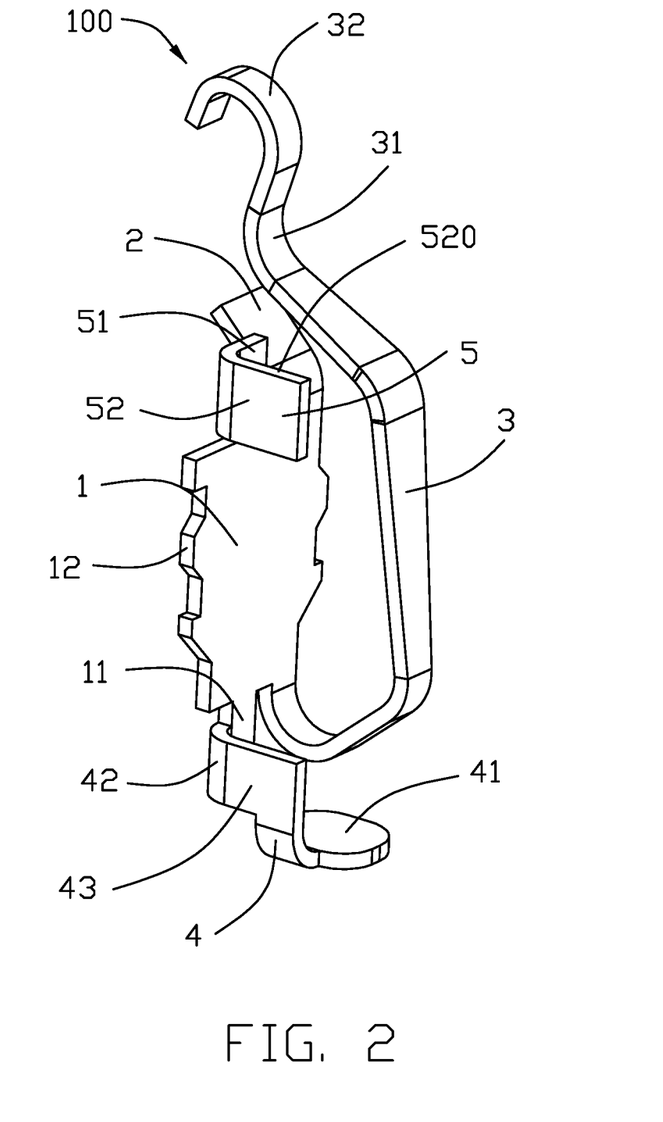
FIG. 2 is another perspective view of the electrical contact of FIG. 1.

Referring to FIGS. 1 and 2, the solder part 4 includes a vertical section 43 parallel to or coplanar with the second connecting section 52 and laterally connected, via a joint 42, to the vertical extension 11 formed at a lower end of the main body 1, and a horizontal solder pad 41 extending from the vertical section 43 and located under the contacting arm 3.

A solder ball (not shown) is adapted to be attached upon the solder pad 41. Notably, the angle between the vertical extension 11 and the vertical section 43 can be different from the right angle.

Figure 7:
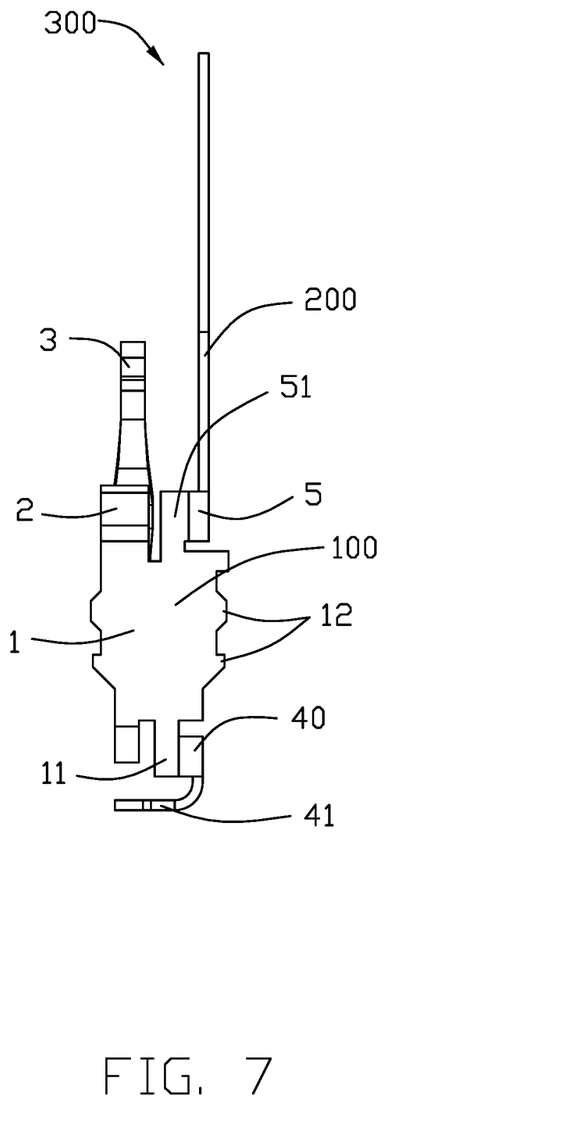
FIG. 7 is a side view of the contacts of the associated carrier strip of FIG. 5.
Figure 8:
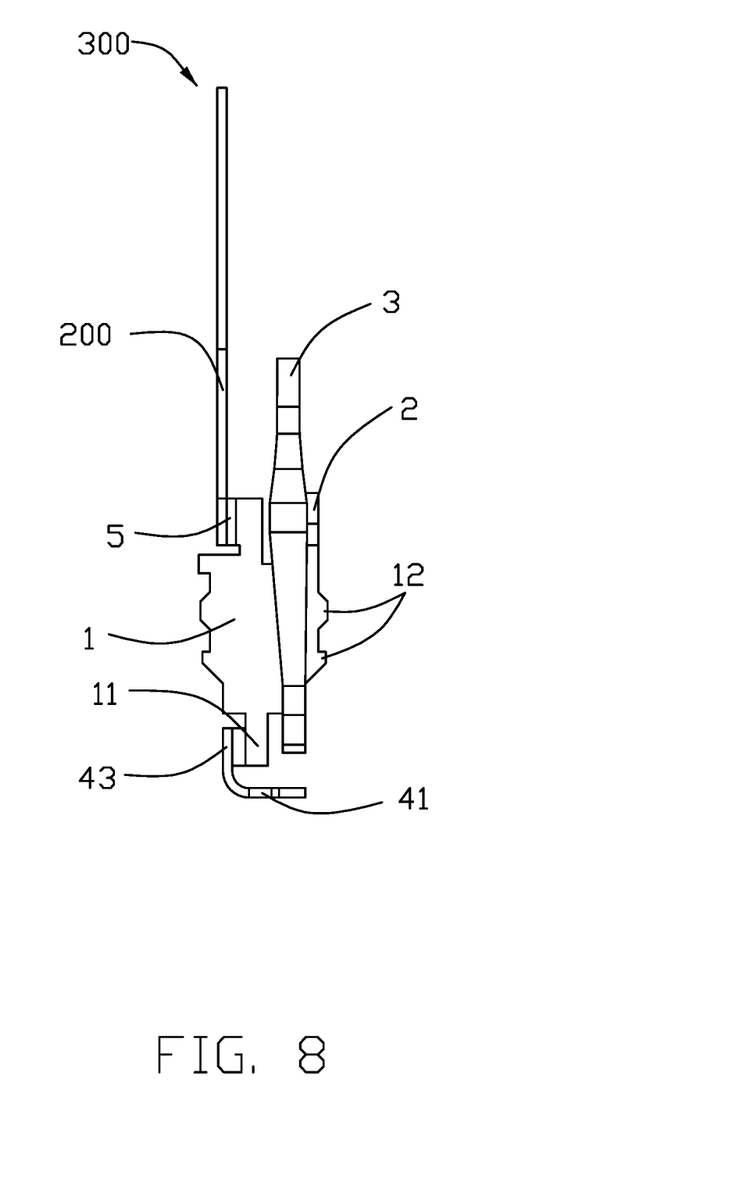
FIG. 8 is another side view of the contacts and the associated carrier strip of FIG. 5.

Referring to FIGS. 7 and 8, both the contacting arm 3 and the supporting arm 2 are located on one lateral side of the main body 1 while both the solder part 4 and the connecting part 5 are located on the other lateral side of the main body 1.

Referring to FIGS. 3 and 4, the contacting arm 3 includes a first bending section 33 extending from the main body 1, an upstanding section 34 extending upwardly from the first bending section 33, and a second bending section 35 extending from the upstanding section 34 toward the supporting arm 2 wherein the oblique section 31 extends from the second bending section 35. As shown in FIG. 4, the first bending section 33, the upstanding section 34 and the second bending section 35 are located by one side of the vertical plane defined by the main body 1 in the first transverse direction T1 while the oblique section 31 and the contacting region 32 are located by the other side of the vertical plane defined by the main body 1 in the second transverse direction T2.

Referring to FIGS. 5-8, the carrier strip 200 includes a main plate 201 and a plurality of extensions 202 respectively linked to the second connecting section 52 of the corresponding connecting part 5 of the contacts 100. Notably, because the main body 1 lies in the plane which is perpendicular to the plane the carrier strip 200 lies, the self-contacting region 10 is spaced away from carrier strip 200 in a direction which is perpendicular to the main plate 201. Understandably, the coating tool (not shown) is approaching the self-contacting region 10 along said direction opposite to the carrier strip 200. Therefore, there is less possibility to contaminate the carrier strip 200 during coating the self-contacting region 10, thus assuring no wasting gold coating.

While a preferred embodiment in accordance with the present disclosure has been shown and described, equivalent modifications and changes known to persons skilled in the art according to the spirit of the present disclosure are considered within the scope of the present disclosure as described in the appended claims.

What is claimed is:

1. An electrical contact for use within an electrical connector, comprising:
   a main body defining a vertical plane;
   a resilient contacting arm extending curvedly and upwardly from a lower edge of the main body toward initially a first transverse direction which is perpendicular to the vertical plane;
   an upwardly supporting arm extending upwardly from an upper edge of the main body toward a second transverse direction which is opposite to the first transverse direction;
   the contacting arm being adapted to downwardly contact the supporting arm when the contacting arm is downwardly pressed by a CPU (Central Processing Unit) so as to form therebetween a self-contacting region on which a special metal coating is applied; and
   a connecting part extending from an upper portion of the main body and located beside the supporting arm, said connecting part including a first connecting section coplanar with the main body, and a second connecting section angled with the first connecting section; wherein
   the second connecting section is spaced away from the self-contact region, and the second connecting section forms an upper edge adapted to be connected with a carrier strip which is used to load the contact into the connector.

2. The electrical contact as claimed in claim 1, wherein both the contacting arm and the supporting arm located on a same lateral side of the main body while the connecting part is located on the other lateral side of the main body.

3. The electrical contact as claimed in claim 2, wherein a solder part is formed on a lower portion of the other lateral side of the main body.

4. The electrical contact as claimed in claim 3, wherein the solder part includes a horizontal solder pad adapted to accommodate a solder ball, and a vertical section parallel to the second connecting section.

5. The electrical contact as claimed in claim 1, wherein the main body includes a pair of barbed structures on two lateral side edges.

6. The electrical contact as claimed in claim 1, wherein the supporting arm extends away from the contacting arm.

7. The electrical contact as claimed in claim 1, wherein the second connecting section is perpendicular to the first connecting section.

8. The electrical contact as claimed in claim 1, wherein the contacting arm includes an oblique section adapted to abut against the supporting arm, and a contacting region extending from the oblique section.

9. The electrical contact as claimed in claim 1, wherein a portion of the contacting arm is located by one side of the vertical plane in the first transverse direction while a remaining portion of the contacting arm is located by the other side of the vertical plane in the second transverse direction.

10. The electrical contact as claimed in claim 1, wherein in a side view, the supporting arm and the second connecting section are respectively located by two sides of the main body.

11. An electrical contact for use within an electrical connector, comprising:
   a main body extending in a vertical plane with a pair of barbed structures on two lateral side edges thereof;
   a resilient contacting arm extending curvedly and upwardly from a portion of the main body;
   an upwardly supporting arm extending upwardly from another portion of the main body;
   the contacting arm being adapted to downwardly contact the supporting arm when the contacting arm is downwardly pressed by a CPU (Central Processing Unit) so as to form therebetween a self-contacting region on which a special metal coating is applied; and
   a connecting part extending from an upper portion of the main body and located beside the supporting arm, said connecting part including a first connecting section coplanar with the main body, and a second connecting section perpendicular to the first connecting section; wherein
   the second connecting section is spaced away from the self-contact region, and the second connecting section forms an upper edge adapted to be connected with a carrier strip which is used to load the contact into the connector; wherein
   both the connecting part and the supporting arm are wholly located at a same level above the main body and the pair of barbed structure thereof in a vertical direction.

* * * * *